United States Patent
Vyas et al.

(10) Patent No.: US 12,530,249 B2
(45) Date of Patent: Jan. 20, 2026

(54) SCALABLE ERROR ALERT THRESHOLDS BASED ON CONVERSION METRICS FOR DATA PROCESSING FLOWS

(71) Applicant: PAYPAL, INC., San Jose, CA (US)

(72) Inventors: Adhish Nayanendu Vyas, Gilroy, CA (US); Norihiro Edwin Aoki, Woodside, CA (US); Ian Barile, Palo Alto, CA (US)

(73) Assignee: PAYPAL, INC., San Jose, CA (US)

(*) Notice: Subject to any disclaimer, the term of this patent is extended or adjusted under 35 U.S.C. 154(b) by 43 days.

(21) Appl. No.: 18/733,429

(22) Filed: Jun. 4, 2024

(65) Prior Publication Data
US 2025/0370835 A1    Dec. 4, 2025

(51) Int. Cl.
*G06F 11/07*    (2006.01)

(52) U.S. Cl.
CPC ...... *G06F 11/0754* (2013.01); *G06F 11/0772* (2013.01)

(58) Field of Classification Search
CPC . G06F 11/0754; G06F 11/0772; G06F 11/076
USPC .................................................. 714/57, 47.2
See application file for complete search history.

(56) References Cited

U.S. PATENT DOCUMENTS

| | | | | |
|---|---|---|---|---|
| 7,523,359 B2 * | 4/2009 | Richards | ............... | G06F 11/076 714/49 |
| 2005/0222873 A1 * | 10/2005 | Nephin | .................. | G16H 40/67 707/999.009 |
| 2013/0346594 A1 * | 12/2013 | Banerjee | ............. | G06F 11/3495 709/224 |
| 2017/0265076 A1 * | 9/2017 | Richards | ................. | H04L 43/16 |
| 2022/0181887 A1 * | 6/2022 | Baldasare | .......... | G07C 9/00912 |
| 2022/0319299 A1 * | 10/2022 | Menzel | ................ | G08B 29/185 |
| 2023/0109280 A1 * | 4/2023 | Eberlein | ............... | G06F 11/302 714/47.1 |

FOREIGN PATENT DOCUMENTS

| | | | | | |
|---|---|---|---|---|---|
| CN | 110830450 A | * | 2/2020 | ......... | H04L 63/1425 |
| CN | 113849337 A | * | 12/2021 | .......... | G06F 11/0793 |

* cited by examiner

*Primary Examiner* — Chae M Ko
(74) *Attorney, Agent, or Firm* — Haynes and Boone, LLP (70481)

(57) ABSTRACT

Accuracy, efficiency, and speed improvements for error alerting are provided herein, particularly in the context of error detection and alerting. There are provided systems and methods for scalable error alerts threshold based on conversion metrics for data processing flows. A service provider may utilize different computing services for data processing to provide different computing services to users, such as via websites and/or applications of the service provider. Due to timeouts, failures, and other errors, users may be unable to complete a data processing flow. To provide dynamic error alerting, thresholds for reporting of the errors may be adjusted based on conversion metrics for users abandoning the processing flow at different steps. A threshold for a number of users that fail to complete the flow at certain steps may be adjusted to account for users that may abandon due to errors or other reasons.

20 Claims, 7 Drawing Sheets

SCALABLE ERROR ALERT THRESHOLDS BASED ON CONVERSION METRICS FOR DATA PROCESSING FLOWS

TECHNICAL FIELD

The present application generally relates to error detection and reporting in computing systems and applications, and more particularly to scaling error alerts and reporting based on conversion metrics for completion of data processing flows.

BACKGROUND

Users may utilize online service providers and corresponding computing systems and services to perform various computing operations and view available data. Generally, such computing operations are provided by online platforms and systems, which may provide applications and services for account establishment and access, messaging and communications, electronic transaction processing, and other types of available services. During performance of these operations, the service provider may utilize one or more applications to process data, which may include use of data processing flows having different steps or stages. However, processing of real-time data by applications and/or in a production computing environment may fail or timeout, which leads to errors in applications and executable processes, resulting in failed, inaccurate, or unreliable computing services. This may cause significant drop-off or abandonment of users during processing flows. However, conventional error alerting systems merely notify error handlers and assistance teams when sufficient errors are detected and/or reported, which may not capture the significance of the error at different steps in a processing flow. As such, there exists a need for more dynamic and faster error detection, alerting, and/or reporting for errors occurring at different steps in a data processing flow so that errors may be handled in a more efficient manner, thereby improving application and computing system functionality and interactivity with users.

Figure 1:
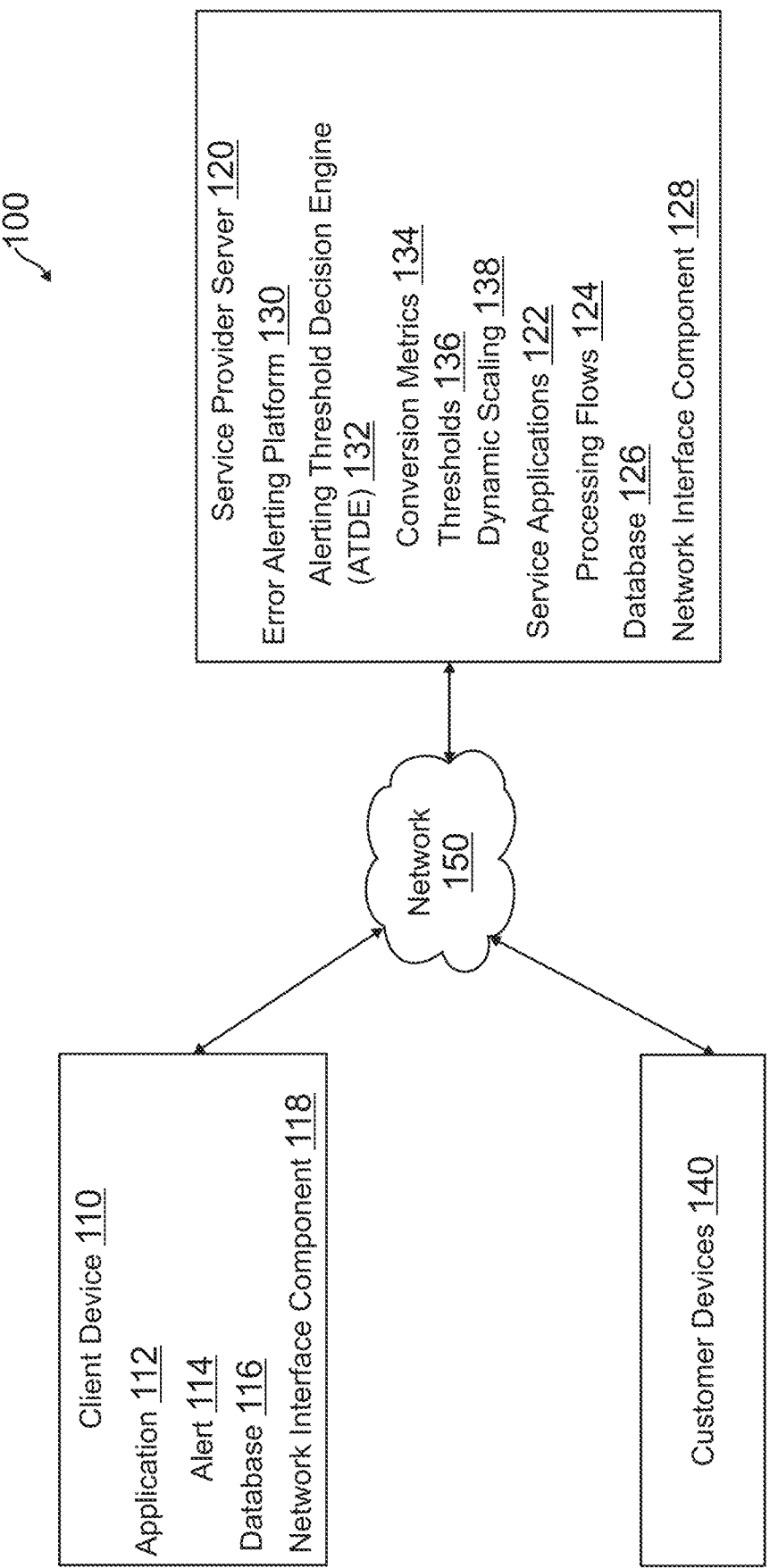
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for scalable error alert thresholds based on conversion metrics for data processing flows. Systems suitable for practicing methods of the present disclosure are also provided.

Service providers may receive, handle, and process data in order to provide information and computing services to users. Such data may arrive over various types of requests, web or software applications, application programming interface (API) calls, and/or data streaming components and/or systems, as well as from internal applications, computing services, databases, data lakes, or the like. Such data may be handled and processed through different data processing flows, where flows may have multiple steps during which the data may be exchanged, formatted, processed, stored, or otherwise utilized to provide responses, results, and other outputs to users. In conventional systems, the data may be processed, and downstream computing services, data reporting or informational resources, applications, account portals, interfaces, and/or other endpoints may receive the data for further processing and/or output to users. However, errors and failures in data delivery, receipt, loading, and/or processing may cause certain data to not be properly handled and users to encounter errors. Errors or timeouts may be due to data processing errors, computing attacks, and other events. For example, data processing failure may occur due to processing node timeout, application programming interface (API) failures or unresponsive calls, failures to receive and/or load events due to transmitting or receiving endpoints, data processing or run-time errors, fraud or computing attacks that compromise the computing systems, or when other failure conditions occur.

When this occurs, users may drop-off, abandon, or otherwise fail to complete the data processing flow. Where the data processing flow may correspond to a request, such as a transaction processing request, the service provider therefore does not complete the transaction through the data processing flow, leading to transaction abandonment, loss of revenue, and other undesirable outcomes. While users may retry data processing and/or resubmit data, many users may find this laborious and therefore drop-off from the data processing flow and/or task they were attempting and/or requesting. While a small amount of drop-off or abandonment of data processing (e.g., failure to complete a data processing flow) may be expected, when it occurs late into the flow after several steps, the user experience may be negatively impacted and lead to loss of users and interactions. However, alerting error handlers and assistance teams for all errors would not be feasible due to the increasingly large volume of traffic that service providers encounter. Conversely, if too few error alerts are issued, more users may abandon flows and processing tasks, leading to further loss, customer friction and poor customer experience, and faulty or error-prone systems staying in use even while errors are known. As such, inaccurate, inefficient, or slow and static alerting applications and system components may adversely affect computing systems of service providers.

To account for these issues, in one embodiment, a service provider may provide a dynamic error alert system that dynamically scales thresholds for different prioritization designations. Conversion metrics for users completing or failing to complete different steps of a data processing flow may be detected in real-time and may be intelligently processed using a machine learning (ML) engine or other artificial intelligence (AI), such as a system employing one or more ML models, neural networks (NNs), or the like. The impact of the errors may be identified by the conversion metrics and may be compared to expected abandonment rates by users. For example, user behaviors may indicate how likely a user is to complete a processing flow (e.g., convert, such as a customer completing a pending or potential transaction to a completed transaction through finishing the processing flow). Thus, if more users are abandoning the flow at a particular step due to an error, a threshold to signal an alert to a debugging system or team, error handler, help or assistance ticketing system, or the like may be dynamically adjusted or scaled so that alerts may be correspondingly scaled (e.g., downward to alert at a lower number of users and thus more sensitive to higher abandonment, or upward to alert at a higher number of users and less sensitive to abandonments).

In this regard, a service provider, such as an online transaction processor, may provide computing services to users and/or their corresponding entities, which may include end users and customers, merchant customers for an online transaction processor, businesses and their representatives and/or employees, and the like. In some embodiments, these computing services may include those associated with electronic transaction processing, payments, and/or cryptocurrency trading and payment processing. In order for users to utilize computing services of a service provider, the service provider (e.g., an online transaction processor, such as PAYPAL®) may require users and other entities requesting the services to have an account with the service provider. A user wishing to establish an account may first access the online service provider and request establishment of the account. Account and/or corresponding authentication information with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments. The user may also establish, purchase, trade, and/or store cryptocurrency (e.g., through storage, exchange, and/or use of private keys for cryptocurrency values, tokens, or digital currency). This information may be used to process transactions for items and/or services and provide assistance to users with these payment instruments and/or payment processing. In some embodiments, the account creation may establish account funds and/or values, such as by transferring money into the account and/or establishing a credit limit and corresponding credit value that is available to the account and/or card. Funds may also be established by storing private keys and/or generating, maintaining, and/or linking to an online digital "hot" wallet and/or offline digital "cold" wallet for cryptocurrency. The online payment provider may provide digital wallet services, which may offer financial services to send, store, and receive money, process financial instruments, and/or provide transaction histories, including tokenization of digital wallet data for transaction processing. The application or website of the service provider, such as PAYPAL® or other online payment provider, may provide payments and other transaction processing services.

Once the account of a user is established with the service provider, the user may utilize the account via one or more computing devices, such as a personal computer, tablet computer, mobile smart phone, or the like. The user may engage in one or more online or virtual interactions that may be associated with electronic transaction processing, images, music, media content and/or streaming, video games, documents, social networking, media data sharing, microblogging, and the like. Similarly, the merchants may use the accounts when providing their merchant services to customers, such as during electronic transaction processing. Different online use of accounts and/or computing services of the service provider may correspond to requests, activities, and/or interactions for one or more events that occur and may be processed by the computing applications, platforms, and/or systems of the service provider, such as by using a networked, server-based, and/or cloud computing infrastructure and service.

However, errors may occur during use of computing services, and users may be adversely impacted. This may cause drop-off and abandonment of service usage, thereby not converting data processing attempts to successful completion. The service provider may implement an error alerting system that may dynamically scale error alert thresholds for users that abandon, do not complete, or fail to convert data processing flows for services and/or request handling based on the number of detected users in real-time, such as from conversion metrics for converted users and requests (e.g., converted from request and processing to completion). Thresholds may cause alerts to be generated and sent to error handlers, debugging teams, security and/or website/application integrity users, or other users, teams, or systems that assist in managing, handling, and fixing errors. Thresholds may be established individually for different steps or stages in a data processing flow, and each step may further have one or more thresholds, where multiple thresholds may be used when different prioritization levels are desired (e.g., priority levels or other flags or codes for error severity, urgency, or importance of real-time detected conversion metrics).

Conversion metrics may be analyzed from different components, applications, and platforms of the service provider for those users that complete or fail to complete a data processing flow after engaging in that flow, the reason for abandonment or completion failure, and the like. For example, conversion metrics may correspond to detected numbers, amounts, and/or rates of users dropping off, abandoning, or otherwise failing to complete a processing step within a data processing flow. Each step may correspond to a specific task, series of tasks, or the like that may need to be completed in a processing flow before advancing to the next task, such as a set of inputs needed, a data processing task requiring handling and/or a response, a data loading event, or the like. Thus, a data processing flow may be made up of these individual steps, where errors may occur at each step, and users abandoning due to these failures, as well as users abandoning more generally (e.g., users that may not have intended to complete a flow, such as pay for a transaction or purchase cryptocurrency) and not due to a specifically encountered error that may require retrying processing or repeating one or more steps.

Data for conversion metrics may come from different system components including an analytics platform, an incentive platform, a marketing platform, a market data feed, and/or user behavior data. For example, data for conversion metrics may be collected and/or received, as well as streamed via one or more data streamers, components, and/or cloud-based streaming service, to one or more endpoints for processing. These endpoints may correspond to specific devices, data repositories, or the like that process and store the data, as well as serve the data to downstream applications, devices, and/or services. An alerting threshold decision engine (ATDE) may consume the data from the different components and make decisions on scaling dynamic thresholds for different steps in processing flows based on conversion metrics. For example, an error monitoring agent and/or tracker may be utilized to identify when errors cause drop-off and abandonment of flows by users, and further trackers may monitor user conversion rates and other abandonments as well. A tracker may correspond to a daemon, software component, application, or the like, which may be executed by corresponding hardware, servers, cloud computes or cloud-based machines, and the like, that may monitor for conversion rates, data processing failures of events and/or event requests, and the like.

Processing jobs and/or tasks may fail, as discussed herein, and as such, the service provider may implement an ATDE and/or framework for a dynamic error alert threshold system to provide further accuracy, efficiency, and reliability of error reporting during error handling. This may provide increased accuracy and faster results for error alerting to quickly report accurate and complete data for detected errors. An analytics platform may correspond to the primary source of current conversion information for the ATDE and may feed the latest or current conversion data to the ATDE. In this regard, to provide improved error alerting to improve conversion rates and maintain a high amount of converting users, if a large enough number of high converting users (e.g., users highly likely to finish a data processing flow, such as those experience past users or users that have proceeded farther into a processing flow and/or completed significant steps), the service provider may tighten thresholds to reduce losses from any outages. This may include lowering the number of non-converting users and abandonments required for meeting or exceeding a threshold, thereby triggering an alert when fewer users are detected as abandoning and failing to complete a flow and/or convert. An event may occur when a user encounters an error, which may include information about this user's history to help determine the severity of the impact to the system by the error and/or processing flow or service outage. As such, the ATDE may adjust and scale thresholds, so the alert system is more sensitive to errors if there are many high-converting users being impacted.

The ATDE may analyze patterns in received data using AI/ML engines, models, and/or algorithms to identify times and/or periods of times where higher conversions occur or are predicted to occur, and therefore automatically tighten thresholds so that alerts are generated and distributed early for faster reactions and more minimal computing service interruptions, downtimes, unavailability, and/or stoppage in service. The ATDE may run continually, periodically, or intermittently to update the alerting thresholds of the alerting platform based on events and other conversion metrics. The ATDE itself may update thresholds based on detected incidents and/or expected conversion levels or amounts of users. For example, the ATDE may update thresholds every 30 mins but may increase updates and/or determination of threshold scaling when it knows a marketing campaign is scheduled or there is known or expected volatility in a market. These patterns may also be based on time of the day, day of the week (pay days/Fridays or weekends, etc.), and other time periods and tune parameters for thresholds accordingly.

While the ATDE is updating thresholds, for example, at different discreet points in time, the ATDE may monitor the incoming data from the components and systems for conversion metrics and data. The ADTE may determine the impact of such data on a conversion rate at different steps in a data processing flow, thereby correlating the information to different times, events, data patterns, and the like. This allows the ML models, NNs, or other AI to predict future conversion rates of the steps of different data processing flows being observed. As such, the AI/ML system of the ADTE may automatically identify different stimuli (e.g., rewards, campaigns, market data, user behavior data, etc.) and assign different weights to each stimulus for an overall computation and/or calculation of the conversion rate at each step of a data processing flow. For example, historical users that used a particular flow (e.g., trade cryptocurrency) may convert at a higher rate. As such, an error that affects such users may be weighted more heavily than a curious user who may just be exploring and is unlikely to convert. This may also depend on how far a user proceeds with the data processing flow, such as a number of preceding steps completed and/or performed, input provided, time spent in the flow or with the corresponding task, and the like.

After scaling the thresholds by the ATDE, an alerting platform (e.g., a platform that transmits alerts when a number of users are detected as meeting or exceeding a threshold) may utilize the updated thresholds to modify corresponding threshold parameters with alerts. This may change when an alert/notification is generated and sent by the alerting platform. Based on the failed customer interactions due to errors at steps or stages in a processing flow, the alerting platform and system may generate alerts to a system administrator, site reliability engineering (SRE), relevant engineering teams, error handlers, debugging teams, and the like. This may include filing a JIRA®/SRE ticket with a corresponding priority level based on which threshold was breached. If the number of users encountering errors continue to increase, the alerting platform may issue new alerts at a higher the priority level accordingly for newly breached thresholds, and thresholds may be adjusted to be more or less sensitive as needed. Conversely, thresholds may be adjusted when the number of users/errors decrease to similarly adjust alerting sensitivity.

Further actions may also be automated with alert generation, such as to reduce errors and/or conversion failures and improve likelihood of users completing processing flows. In one example, priority may be scaled from 0—highest to 5—lowest for different thresholds at steps in a processing flow. In such an example, for priority 0 or 1 errors and breached thresholds, the alerting platform may also proactively block any pending or in process roll outs of new features and functionality until an administrator has had a chance to evaluate the situation and errors. This may thereby reduce the chances of increasing conversion failures and poor customer experiences by rolling out new code in the midst of an ongoing issue. As such, the scalable thresholds may increase alerting sensitivity during predicted times to identify issues causing conversion failures earlier and resolve those issues and errors before further impact on the system.

In this manner, a service provider may provide an automated and efficient alerting platform for errors that cause data processing failures and conversion issues through scalable alerting thresholds. This may allow for faster, more accurate, and more efficient alerting of errors in computing systems and encountered during data processing flows so that such errors may be rectified and fixed prior to further conversion failures that lead to poor user interaction and loss of user support and engagement. This may also assist with preventing or deterring computing attacks and abuse, system errors, and the like by more proactively handling any such malicious behaviors during high demand times. As such, service providers may provide reliable data processing in a timely and efficient manner where users encounter less errors and errors are fixed faster to facilitate less retries. Thus, the service provider may provide a more accurate, efficient, and coordinated alerting system of computing system errors.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a client device 110, a service provider server 120, and customer devices 140 in communication over a network 150. Client device 110 may be utilized by a system administrator, debugging team member, or other user that provides assistance with and repair of computing errors that may be caused during the use of applications, websites, and other resources of service provider server 120, where service provider server 120 may provide various data, operations, and other functions to client device 110 and customer devices 140 via network 150. Alerting of client device 110 may be based on dynamically scaled thresholds for numbers of users that may be detected as abandoning of failing to convert data processing flows before completion. Such conversion rates and metrics may be determined based on errors encountered by customer devices 140, as well as predicted engagement by users. As such, customer devices 140 may each be used to establish an account with service provider server 120, which may be used for electronic transaction processing of items with customers of the merchant, as well as interaction with and usage of services of service provider server 120. As such, customer devices 140 may encounter errors that client device 110 detects or is otherwise alerted to in order to remedy and fix such errors.

Client device 110, service provider server 120, and customer devices 140 may each include one or more processors, memories, and other appropriate components for executing instructions such as program code and/or processing data stored on one or more computer readable mediums to implement the various applications, process data, and steps described herein. For example, such instructions and data may be stored in one or more computer readable media such as memories or data storage devices internal and/or external to various components of system 100, and/or accessible over network 150.

Client device 110 may be implemented as a communication device that may utilize appropriate hardware and software configured for wired and/or wireless communication with service provider server 120, customer devices 140, and/or other devices or servers. Client device 110 may be utilized, for example, by internal end users, team members, and the like that may assist with error resolution for service provider server 120. In some embodiments, client device 110 may be implemented as a single or networked personal computers (PCs), servers, a smart phone, laptop computer, wearable computing device, and/or other types of computing devices. Although only one device is shown, a plurality of devices may function similarly.

Client device 110 of FIG. 1 contains an application 112, a database 116, and a network interface component 118. Application 112 may correspond to executable processes, procedures, and/or applications with associated hardware. In other embodiments, client device 110 may include additional or different modules having specialized hardware and/or software as required.

Application 112 may correspond to one or more processes to execute software modules and associated components of client device 110 to provide features, services, and other operations for a user for use with service provider server 120, such as to provide access to and service of computing services provided by service provider server 120 (e.g., error maintenance, resolution, and other assistance). In this regard, application 112 may correspond to specialized software utilized by a user of client device 110 to receive an alert 114 and respond to alert 114, such as by reviewing the error causing alert 114, information provided with alert 114 for the errors encountered by customer devices 140 including network traffic, firewall, and other computing logs, and the like. Application 112 may also be utilized to address issues causing the error and alert 114 including system, application, and/or website maintenance, debugging, code changes or updates, update rollout or rollback, testing and troubleshooting, and the like.

Application 112 may correspond to a general browser application configured to retrieve, present, and communicate information over the Internet (e.g., utilize resources on the World Wide Web) or a private network. For example, application 112 may provide a web browser, which may send and receive information over network 150, including retrieving website information, presenting the website information to the user, and/or communicating information to the website. However, in other examples, application 112 may include a dedicated application of service provider server 120 or other entity that may interact with service provider server 120 during error resolution and review of alert 114 including specialized software for malware, debugging, sandbox environments for testing, system analysis or diagnostics, and the like. Thus, application 112 may also correspond to different service applications and the like. When utilizing application 112 with service provider server 120, application 112 may request and/or receive alert 114, where alert 114 may be transmitted in response to an issue with a processing flow that meets or exceeds a dynamically scaled threshold based on conversion metrics and other data.

Client device 110 includes other applications as may be desired to provide features to client device 110. For example, these other applications may include security applications for implementing client-side security features, programmatic client applications for interfacing with appropriate application programming interfaces (APIs) over network 150, or other types of applications. Other applications on client device 110 may also include email, texting, voice and IM applications that allow a user to send and receive emails, calls, texts, and other notifications through network 150. In various embodiments, the other applications may include those that may be utilized in the course of system administration, maintenance, debugging, error resolution, engineering, and the like. The other applications may include device interface applications and other display modules that may receive input from the user and/or output information to the user. For example, client device 110 may contain software programs, executable by a processor, including a graphical user interface (GUI) configured to provide an interface to the user. The other applications may use devices of client device 110, such as display devices capable of displaying information to users and other output devices, including speakers.

Client device 110 may further include or be associated with database 116, which may store various applications and data and be utilized during execution of various modules of client device 110. Database 116 may correspond to different types of data storage and components including cloud computing storage nodes, remote data stores and database systems, distributed database systems over network 150, and the like used to store various applications and data. Database 116 may include, for example, identifiers such as operating system registry entries, cookies associated with application 112 and/or other applications, identifiers associated with hardware of client device 110, or other appropriate identifiers, such as identifiers used for user/device authentication or identification, which may be communicated as identifying the user/client device 110 to service provider server 120.

Client device 110 includes at least one network interface component 118 adapted to communicate with service provider server 120, customer devices 140, and/or another device or server. Network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 120 may be maintained, for example, by an online service provider, which may provide computing services that utilize and/or provide data processing through service applications 122, where reliability and integrity of such applications may be maintained in a faster and more efficient manner through scalable alerting thresholds. In this regard, service provider server 120 includes one or more processing applications which may be configured to interact with client device 110 and/or customer devices 140, for example, to provide services to customer devices 140 and/or alert client device 110 of errors occurring at steps in data processing flows. In one example, service provider server 120 may be provided by PAYPAL®, Inc. of San Jose, CA, USA. However, service provider server 120 may be maintained by or include another type of service provider.

Service provider server 120 of FIG. 1 includes an error alerting platform 130, service applications 122, a database 126, and a network interface component 128. Error alerting platform 130 and service applications 122 may correspond to executable processes, procedures, and/or applications with associated hardware. In other embodiments, service provider server 120 may include additional or different modules having specialized hardware and/or software as required.

Error alerting platform 130 may correspond to a digital platform, software application and/or application architecture, or the like that may include one or more processes that execute modules and associated specialized hardware of service provider server 120 to receive incoming and/or streaming data, such as in real-time and/or from data events and requests being processed and determine whether alerts should be generated for detected errors based on error alerting thresholds. In this regard, service applications 122 may correspond to specialized hardware and/or software that may utilize and/or access data from different data components to make decisions on whether to dynamically scale and adjust different alerting thresholds for error alert generation and issuance when different errors occur, and users fail to convert to completing data processing flows. As such, error alerting platform 130 may include an alerting threshold decision engine (ATDE) 132, which may process conversion metrics 134, as well as any additional known, predicted, or contextual data for events that may cause abandonments or failures by users to convert processing flows to completion, to adjust thresholds 136 based on intelligently determined dynamic scaling 138.

In this regard, ATDE 132 of error alerting platform 130 may process data from service applications 122 during use of such applications and computing services by users and entities, which may include detected errors and conversion metrics 134 for users that may be engaged in one or more of processing flows 124 for data processing of requests and other events. As such, during processing of data during processing flows 124, a failure or other error may occur, which results in a user abandoning a corresponding one of processing flows 124, thereby contributing to conversion metrics 134 indicating different numbers of users that fail to complete and/or convert the data processing flow generally, due to errors, or cause by another reason. These failures and errors result in failure of data processing and completion of requests for data that may be requested from devices and servers, such as computing devices 140, which requires error maintenance and resolution to fix and resolve for less interruptions and poor experiences during interactions by users. When a number of users abandon or otherwise fail to convert data processing during one of processing flows 124 during use of service application 122 meets or exceeds a dynamically scaled threshold, ATDE 132 may cause generation, issuance, and/or transmission of a corresponding alert to an endpoint.

As such, when conversion metrics 134 are received and/or determined by ATDE 132, ATDE 132 may be invoked for adjusting thresholds 136 based on determined dynamic scaling 138. ATDE 132 may correspond to a software daemon or other executable application or process, which may run automatically and/or in a background computing environment, that detects conversions metrics 134 and corresponding error data, and alerts teams, team members, error handlers, and other endpoints of errors with a prioritization designation, as discussed herein. In this regard, the software daemon or other software application, operation, or component may run or execute with different components to monitor outputs and/or detect failures of data processing with conversion metrics 134. An intelligent engine of ATDE 132 may then compute dynamic scaling 138 for thresholds 136.

For example, ATDE 132 may include ML or neural network (NN) models trained using training data to predict conversion rates and/or dynamic scaling 138 of thresholds 136 based on conversion metrics 134 and other events, scenarios, or current information and contexts. When building such AI models, training data may be used to generate one or more classifiers and provide scores, decisions, predictions, or other outputs based on those classifications and an ML or NN model algorithm and/or trainer. Feature engineering and/or selection may be used to select a set of input features and their corresponding data used during training and inference phases of the ML, NN, or other AI models of ATDE 132, such as scores for input data for those features, and whether those scores meet or exceed a threshold for alerting of detected errors. For example, ML models for ATDE 132 may include one or more layers, branches of a tree, or the like, including an input layer/node(s), a hidden or intermediary layer/node(s), and an output layer/node(s) having however, different configurations may also be utilized. As many hidden or intermediary layers/nodes as necessary or appropriate may be utilized.

Each node for data processing in a decision tree, neural network, or the like may be connected to a node within an adjacent layer, pathway, branch, or the like, where a set of input values may be used to generate one or more output values or classifications. Within the input nodes, each node may correspond to a distinct attribute or input data feature that is used to train AI models for ATDE 132 and during model inference, for example, using feature or attribute extraction. When training, the features may correspond to conversion metrics 134 and other events, scenarios, or contexts for users that may utilize or engage with processing flows 124 at different times. For example, contextual features for transactions and uses of processing flows 124 may include expected uses or changes in volume or number of users using a flow, value of the users and expected conversion likelihood, steps and conversion likelihood at specific steps in processing flows 124, and the like.

Nodes that are hidden or intermediary between the input and output of the ML models or NNs of ATDE 132 may be trained with these attributes and corresponding weights using an ML or NN algorithm, computation, and/or technique. For example, each of the nodes in the hidden layer generates a representation, which may include a mathematical ML computation (or algorithm) that produces a value based on the input values of the input nodes. The ML algorithm may assign different weights to each of the data values received from the input nodes. The hidden nodes and/or branches may include different algorithms and/or different weights assigned to the input data and may therefore produce a different value based on the input values. The values generated by the hidden nodes or branches may be used by the output layer node to produce one or more output values for ATDE 132 that attempt to classify whether thresholds 136 should be scaled, and therefore a new number of users to scale thresholds 136. As such, dynamic scaling 138 output by ATDE 132 may correspond to different numbers of users that may trigger an alert to be generated when thresholds 136 are met (e.g., the number of users is met or exceeded), where each of thresholds 136 may also have a corresponding prioritization designation, priority or urgency level, or the like. Thus, when ATDE 132 are used to perform a predictive analysis and output, the input may provide a corresponding output based on the classifications trained for ATDE 132.

ATDE 132 may be trained by using training data associated with conversion metrics 134 and other model features. By providing training data to train the ML models or NNs of ATDE 132, the nodes in the layers, branches, or the like may be trained (adjusted) such that an optimal output (e.g., a classification) is produced in the output based on the training data. By continuously providing different sets of training data, as well as penalizing the ML models or NNs when the output of ATDE 132 is incorrect, those models and networks of ATDE 132 (and specifically, the representations of the hidden nodes) may be trained (adjusted) to improve performance in data classification and determination of dynamic scaling 138. Adjusting and retraining may include adjusting the weights associated with each node in the hidden layers, branches, or the like. Thus, the training data may be used as input/output data sets that allow for ATDE 132 to make classifications based on input attributes. The operations and components used to adjust thresholds 136 using dynamic scaling 138 are described in further detail below with regard to FIGS. 2A-4.

Service applications 122 may correspond to one or more processes to execute modules and associated specialized hardware of service provider server 120 to provide computing services for account usage, digital electronic communications, electronic transaction processing, and/or other services utilized through customer devices 140. In this regard, service applications 122 may correspond to specialized hardware and/or software used by service provider server 120 to provide, such as to customers, merchants, and other users associated with customer devices 140, one or more computing services. Service applications 122 may correspond to electronic transaction processing, account, messaging, social networking, media posting or sharing, microblogging, data browsing and searching, online shopping, and other services available through service provider server 120. Service applications 122 may be used by a user to establish an account and/or digital wallet, which may be accessible through one or more user interfaces, as well as view data and otherwise interact with the computing services of service provider server 120. In various embodiments, financial information may be stored to the account, such as account/card numbers and information. A digital token or other account for the account/wallet may be used to send and process payments, for example, through an interface provided by service provider server 120. The payment account may be accessed and/or used through a browser application and/or dedicated payment application, which may provide user interfaces for use of the computing services of service applications 122. Although account, payment, and electronic transaction processing services are described above, service applications 122 may also provide other computing services including social networking, media posting or sharing, microblogging, data browsing and searching, online shopping, and other services.

The computing services may be accessed and/or used through a browser application and/or dedicated payment application executed by customer devices 140. Such account services, account setup, authentication, electronic transaction processing, and other computing services of service applications 122 may load, serve, and/or operate on data from events and/or based on requests from customer devices 140. In some embodiments, such requests may be processed through data processing flows 124, which may have individual steps during which users are required to provide input, service applications 122 are required to load and/or process data, or other events occur. In this regard, if processing of requests and events in data processing flows 124 fails, error alerting platform 130 may be invoked and utilized to generate alerts to client device 110 and/or other endpoints, such as alert 114 of a particular error being encountered by customer devices 140. Service applications 122 may receive information regarding failed requests and events, as well as their corresponding errors, and may provide the data for error alerting platform 130 for processing. Such information may include conversion metrics, such as how many errors may have resulted in abandoning or otherwise failing to convert and complete one of data processing flows 124, which may be attributed to the error or other cause (e.g., non-serious customers browsing data but with no intention to complete a transaction or other one of data processing flows 124).

Additionally, service provider server 120 includes and/or is associated with database 126. Database 126 may store various identifiers associated with client device 110 and/or customer device 140. Database 126 may also store account data, including payment instruments and authentication credentials, as well as transaction processing histories and data for processed transactions. Database 126 may store financial information and tokenization data, as well as data associated with conversion metrics and dynamic threshold adjustment based on those conversion metrics. Although database 126 is shown as residing on service provider server 120 as a database, in other embodiments, other types of data storage and components may be used including cloud computing storage nodes, remote data stores and database systems, distributed database systems over network 150 and/or of a computing system associated with service provider server 120, and the like.

Service provider server 120 may include at least one network interface component 128 adapted to communicate with client device 110, customer devices 140, and/or other devices and servers over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Customer devices 140 may correspond to devices and/or servers of other users and/or entities including customers and/or businesses that may interact with service provider server 120 for transaction processing and/or use of other computing services. Customer devices 140 may utilize and/or be associated with account information, user financial information, and/or transaction histories for electronic transaction processing, including processing transactions using financial instrument or payment card data via service provider server 120. Customer devices 140 may be utilized to enter, view, and/or process items the user wishes to purchase in a transaction, as well as perform peer-to-peer payments and transfers and view content or data. In this regard, customer devices 140 may provide transaction processing, such as through a user interface enabling the user to enter and/or view the items that the user wishes to purchase or access in a transaction. Thus, customer devices 140 may also be used by a user to provide payments and transfers to another user or merchant. Further, additional services may be provided via customer devices 140, including social networking, media posting or sharing, microblogging, data browsing and searching, online shopping, and other services available through service provider server 120. However, use of such services may fail or otherwise encounter errors, which prevents, slows, or inconveniences users proceeding through a data processing flow. For example, a data processing request may fail to be processed through a corresponding flow provided by the applications of service provider server 120. This may cause drop-off and abandonment, such as by having users fail to convert and therefore complete the corresponding flow. As such, service provider server 120 may dynamically scale error alerting thresholds to more proactively alert client device 110 of these errors causing the users of customer devices 140 to fail to convert during a flow, which may allow for earlier and faster error resolution, as discussed herein.

Network 150 may be implemented as a single network or a combination of multiple networks. For example, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
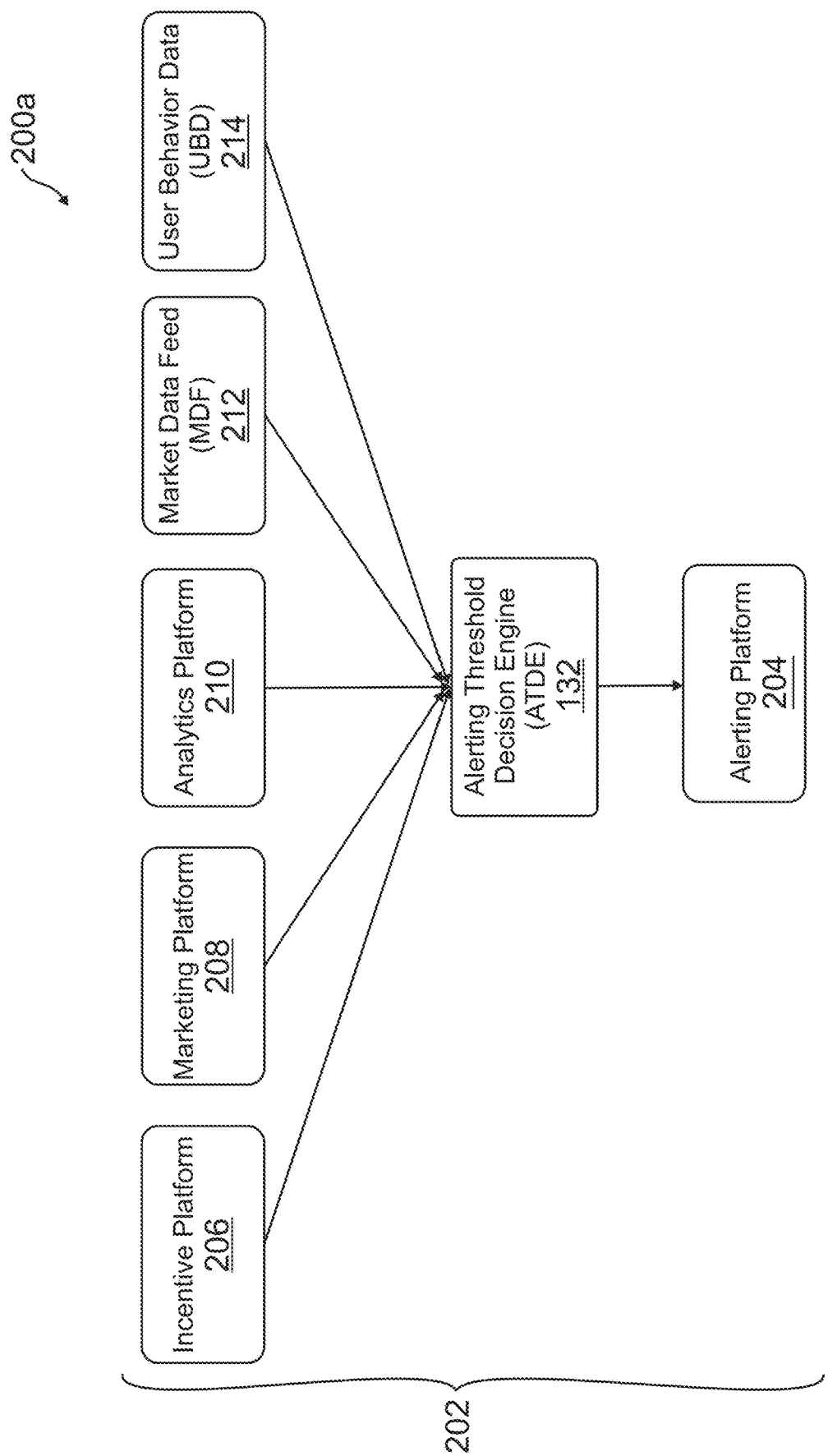
FIGS. 2A and 2B are exemplary computing environments in which a machine learning model or other artificial intelligence is deployed to perform dynamic scaling of thresholds for error alerting, according to an embodiment.
Figure 2B:
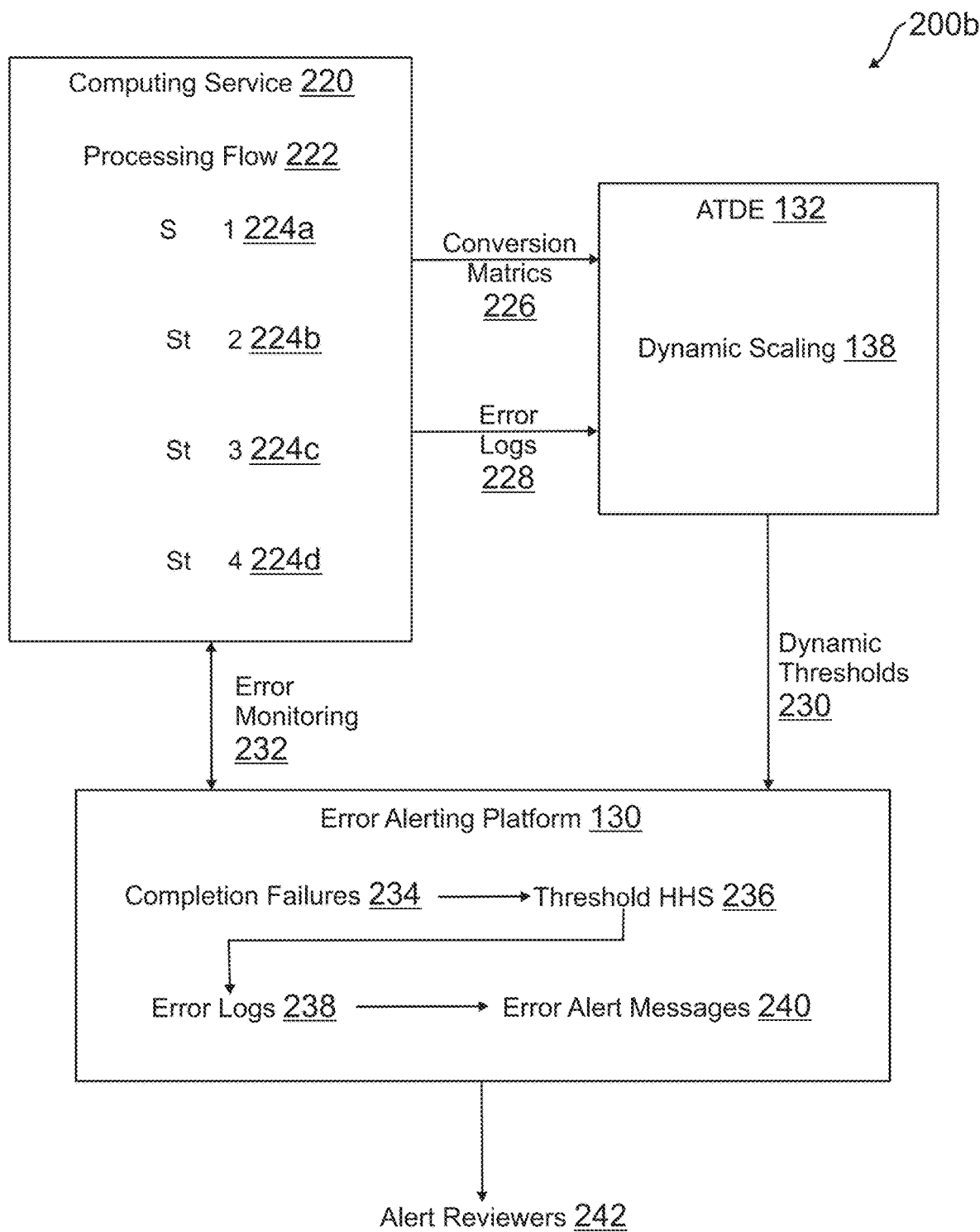

FIGS. 2A and 2B are exemplary computing environments 200a and 200b in which a machine learning model or other artificial intelligence is deployed to perform dynamic scaling of thresholds for error alerting, according to an embodiment. Computing environments 200a and 200b include error alerting platform 130 and ATDE 132 of service provider server 130 discussed in reference to system 100 of FIG. 1. In this regard, computing environments 200a and 200b include the system components that may be utilized to perform dynamic scaling of error alert thresholds based on conversion metrics and other scenario-based, contextual, or upcoming event data.

In computing environment 200a of FIG. 2A, ATDE 132 receives data from different components to make decisions on how to scale and adjust error alert thresholds for detection of numbers of users that may abandon or otherwise fail to complete or convert data processing flows at particular steps in the flows. Once that number meets or exceeds a threshold, an error alert is generated. For example, ATDE 132 may obtain information for dynamic scaling of thresholds from an incentive platform 206, a marketing platform 208, an analytics platform 210, a market data feed (MDF) 212 and/or user behavior data (UBD) 214. Incentives platform 206 may provide specific offers to users, which may indicate those users that may have more offers, as well as offers of larger value, that may be more likely to convert. As such, errors to those users may have a larger impact to overall revenue, indicating when an error alert threshold that may affect such users should be lowered (e.g., when an upcoming event may include a promotion redeemable by such users).

Marketing platform 208 may be responsible for delivering marketing campaigns to the end users, which may drive user behavior shifts and therefore different interactions with and uses of processing flows. For example, with an email campaign, users may be more inclined to execute a transaction and more likely to convert during such a processing flow than during other times when accessing the processing flow through other mechanisms. As such, marketing platform 208 may assist an AI engine of ATDE 132 in determining when to expect higher conversions and flow completions and, therefore, to reduce losses, when to tighten thresholds to catch issues and errors earlier and react faster. Analytics platform 210 may correspond to a source for existing conversion data, which may measure the conversions along different journeys of users. This allows for determination of a normal baseline conversion rate for the system that is measured over time, so that variations of the conversion rate from conversion metrics may be identified for threshold scaling. As such, analytics platform 210 regularly updates the conversion statistics based on prevailing conditions and external factors.

MDF 212 may provide updating pricing information for different purchasable items, assets, currencies, financial securities, and the like. For example, with cryptocurrency or other tradable assets, volatility in prices may be a contributing factor to conversion rates during the buying and selling process, and therefore market prices may be a significant input for the AI engine of ATDE 132. For other data processing flows, other external data feeds may also be used for external data that may impact the conversion process (e.g., stock prices, item prices, bidding prices or current bids for items, etc.). UBD 214 may include different users' previous actions on the platform, which are a good indicator of how they are likely to behave in the future. Generally, a user who has converted highly in the past is more likely to convert highly in the future as well. Failures for a higher converting user should be treated with more importance than a user who has not transacted successfully in the past.

As such, ATDE 132 may utilize the data from the aforementioned components 206-214, and may determine new standards, measurements, or other data for adjustable thresholds, such as a conversion rate and/or number of users that, when detected as failing to convert, trigger an alert to be issued and sent. The thresholds may be adjusted with error alerting platform 130 for different data processing flows, and the thresholds may be scaled based at least on their corresponding flow, an amount completed of the flow, or past rates of users failing to complete the flow (e.g., at different steps or stages in the flow). As such, the thresholds may be preset prior to being dynamically scaled over time based on conversion metrics and other data.

Referring now to computing environment 200b of FIG. 2B, error alerting platform 130 with ATDE 132 is shown performing dynamic scaling 138 with a computing service 220 for a processing flow 222 having steps 224a-224d. In this regard, computing service 220 may report various data to ATDE 132 and/or another platform or service, which generates conversion metrics 226 consumed by ATDE 132 to determine dynamic scaling 138. Conversion metrics 226 may correspond to numbers of users converting or failing to convert at different ones of steps 224a-224d. For example, each of steps 224a-d may be monitored and analyzed to determine users that may abandon or otherwise fail to convert to the next step and/or to completion of processing flow 222. Abandonment or completion failures may further be associated with encountered computing errors, as well as other reasons including lack of funds, disinterest, "window shopping" or merely reviewing processing flow 222 or events/requests processed through processing flow 222, and the like. With conversion metrics 226, ATDE 132 may analyze error logs 228 for dynamic scaling 138, which may indicate error causes, reasons, and corresponding conversion rates. For example, error logs 228 may include computing logs corresponding to occurrences of one or more errors, as well as information for steps 224a-d at which those errors occur.

ATDE 132 may then utilize an intelligent engine or process, such as an ML model, NN, or other AI-based technique, to perform dynamic scaling 138 of thresholds for steps 224a-d, as well as different prioritization designations at each of steps 224a-d. ATDE 132 may provide dynamic scaling 138 to increase or lower thresholds from a base or initial set value to make error alerting platform 130 less or more sensitive, respectively, to increasing conversion rates due to user loss or abandonment from errors during processing flow 222. Thresholds may be scaled to a lower number progressively for each of the different steps based on a number of preceding steps in the data processing flow, such as based on a completion amount or percentage of processing flow 222. For example, the threshold for step 224d may be lower, and therefore more sensitive and trigger at a lower number of users for alert generation, than step 224c, and like with step 224b, and then step 224a. This progressive decrease may take into account the higher likelihood of users converting when later in processing flow 222, and therefore, conversion failures due to errors are more likely due to poor customer interaction and/or experience due to the error. As such, a service provider may desire to be alerted of errors earlier from step 224d to prevent further loss, poor customer experience, and the like. In contrast, where there is an expected decrease in conversion due to high likelihood of "browsing" users or those that may not seriously engage processing flow 222, thresholds may be increased in an upward direction for less error alerting and/or at higher numbers of detected users that fail to convert. Thus, in some embodiments, threshold adjustment may also be based on user attributes and/or past user data, such as a past abandonment rate of the users and/or the data processing flow.

Error alerting platform 130 may utilize dynamic thresholds 230 set by ATDE 132 to perform error monitoring 232 of computing service 220, and corresponding error alerting when dynamic thresholds 230 are breached or met/exceeded. For example, error alerting platform 130 may monitor completion failures 234 of processing flow 222 at different ones of steps 224a-d. When detected, completion failures 234 may be compared to dynamic thresholds 230 for determination of whether there are any breaches of dynamic threshold 230. When such breaches occur, error logs 238 may be identified for corresponding errors causing the decreased conversion rate. This allows for error alert messages 240 to be generated and transmitted to alert reviewers 242, such as different debugging, system administration, error resolution, and/or development teams or users. In this regard, error alert messages 240 may each include a prioritization designation based on the threshold breached. In some embodiments, error alert messages 240 may include a report of the one or more errors identifying a potential computing bug requiring attention, as well as one or more computing logs or other error data associated with the errors encountered by the users, an identification of the step, and/or other data for the error, computing bug, logs, or the like.

Figure 3A:
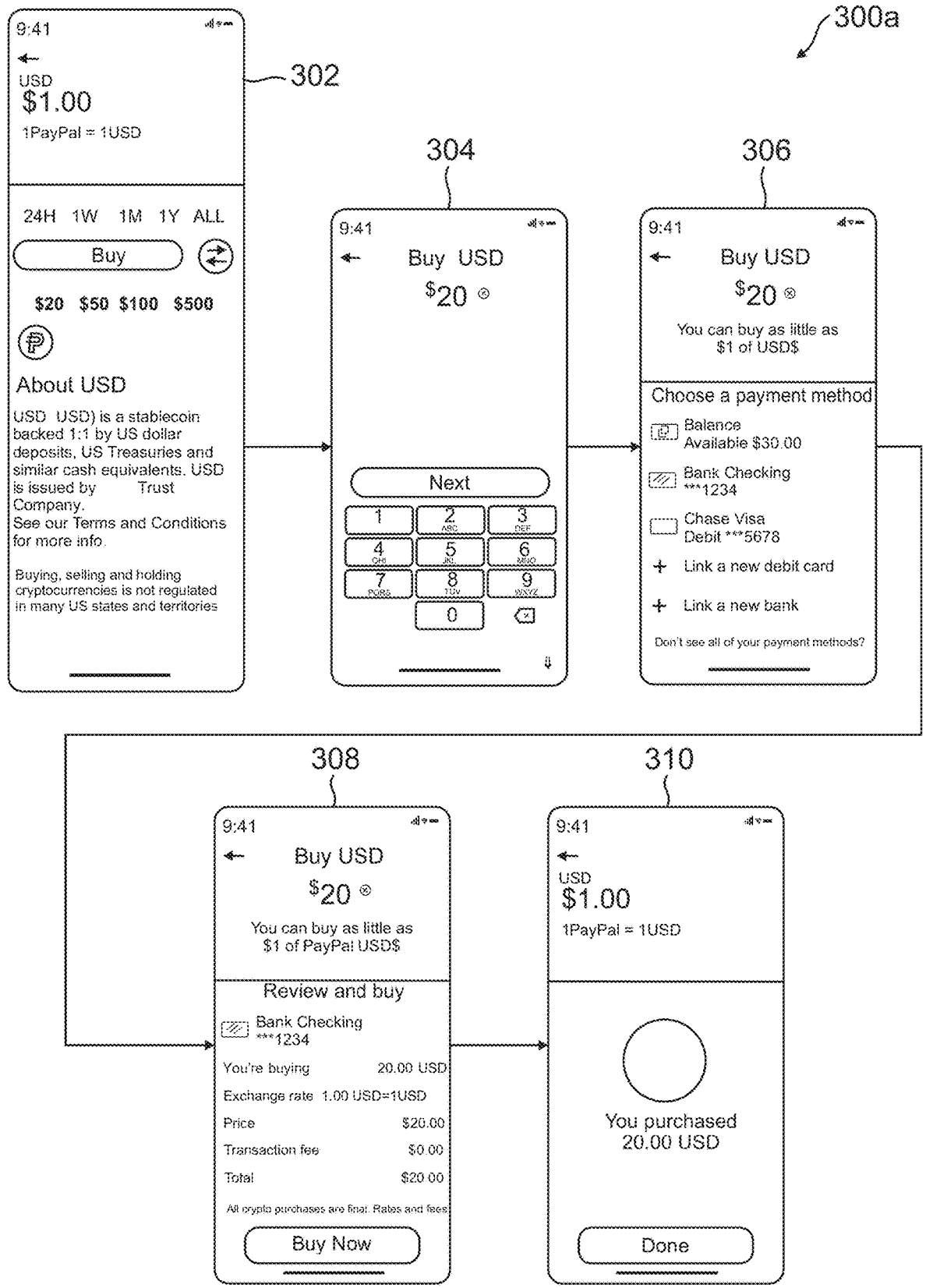
FIGS. 3A and 3B are exemplary diagrams of steps during a processing flow where errors may occur and error alerting thresholds may be dynamically scaled based on conversion metrics and other data, according to an embodiment.
Figure 3B:
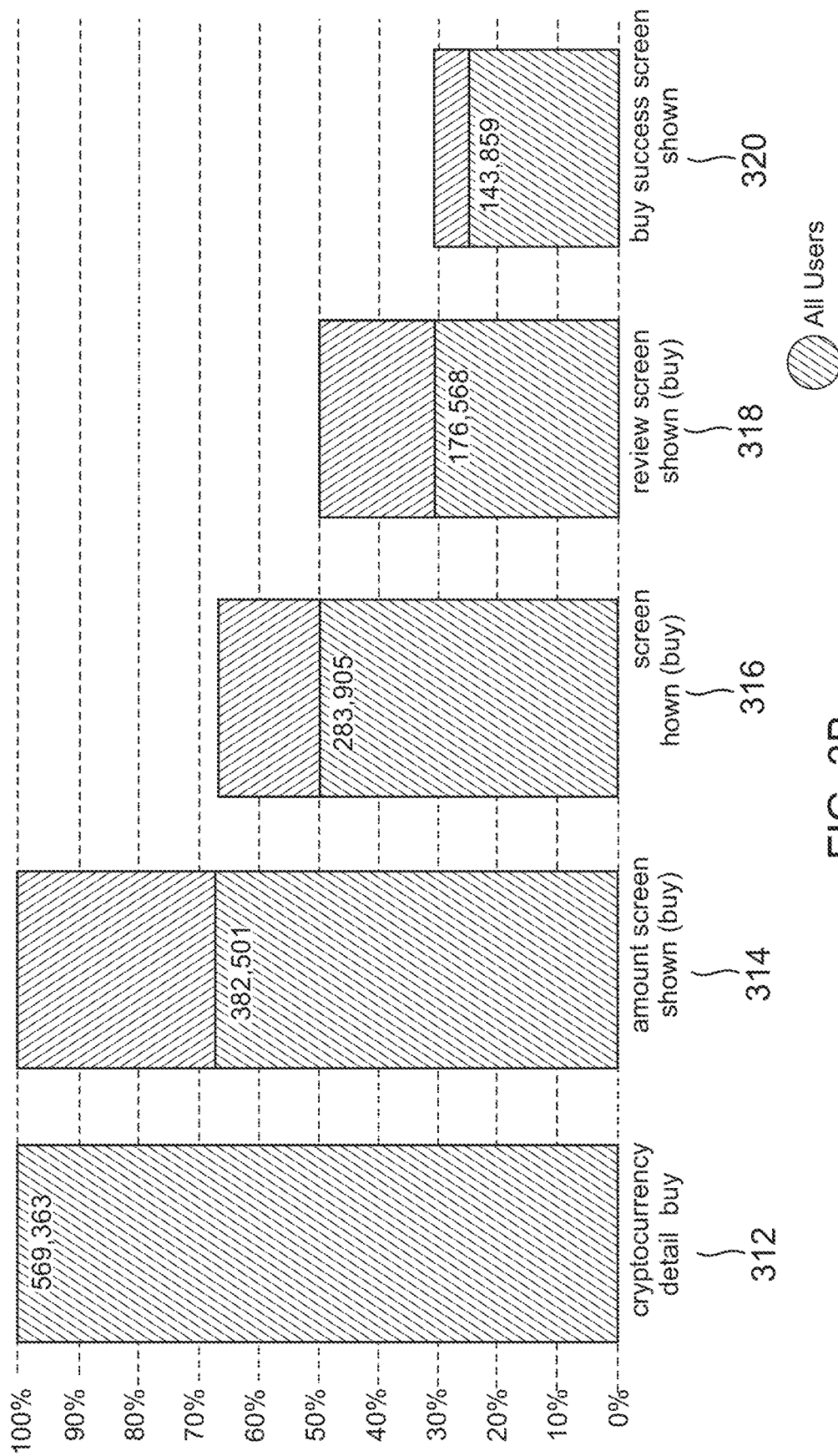

FIGS. 3A and 3B are exemplary diagrams 300a and 300b of steps during a processing flow where errors may occur and error alerting thresholds may be dynamically scaled based on conversion metrics and other data, according to an embodiment. Diagram 300a displays interfaces of steps in a data processing flow as may be presented to a user on a computing device, such as computing devices 140 when interacting with the computing services of service provider server 120 discussed in reference to system 100 of FIG. 1. As such, a user proceeding through the steps in the interfaces shown in diagram 300a may encounter errors, which may cause a user to abandon or fail to convert. Diagram 300b shows scalable thresholds having numbers of users that may be adjusted based on conversion metrics, where breaching of the scalable thresholds in diagram 300b may cause generation and issuance/transmission of an alert to one or more devices, endpoints, users, or the like.

For example, an interface 302 in diagram 300a presents an initial step where a user may first engage in a processing flow for purchase of cryptocurrency. In diagram 300b, a corresponding threshold 312 is set, which shows the threshold number of users is 100% for all users that may utilize the processing flow, thereby not causing alerts when users fail to convert. It may be common for users to start and view a price offering for cryptocurrency purchase, and therefore, no alerts may be generated. However, as users proceed through the steps shown in diagram 300a, the thresholds in diagram 300b may decrease in the number of users required prior to alerting, thereby creating alerts when users fail to convert due to errors, which may be dynamically scaled based on corresponding conversion metrics and other known data (e.g., cryptocurrency sale offerings, market changes, new cryptocurrency offerings or initial coin offerings (ICOs), etc.).

For example, in an interface 304, a second step occurs where a user may establish an amount of cryptocurrency to purchase, thereby increasing their interest and/or seriousness in purchasing cryptocurrency. A corresponding threshold 314 in diagram 300b is shown as decreasing, with a ~30% decrease in the number of users required to trigger an alert. This continues in an interface 306 with a corresponding threshold 316 (e.g., reducing by another 20% to ~50% of users required to trigger an alert), an interface 308 with a corresponding threshold 318 (e.g., by reducing by another 20% to 30%), and an interface 310 with a corresponding threshold 320 (e.g., by reducing another 5% to 25%). Each of thresholds 312-320 may be dynamically scaled according to corresponding conversion metrics and other data, as discussed herein. As such, by decreasing thresholds 312-320, alert generation may be more sensitive to failed user conversions (e.g., by requiring fewer users to trigger an alert), and therefore provide increased alerting of errors causing failed user conversions. Conversely, thresholds 312-320 may be increased to further account for higher likelihood of non-converting users during certain events, time periods, and the like.

While diagrams 300a and 300b show the thresholds being progressively lowered as users move further through a processing flow, thresholds may also be progressively increased instead, such as the converse sale of cryptocurrency. In such embodiments, increasing the threshold may occur where users are more likely to abandon and fail to convert later in a processing flow. For example, with the sale of cryptocurrency, later users may fail to convert due to the volatile nature of cryptocurrency prices, such as if a large price fluctuation occurs during a processing flow and users abandon later due to a no longer desired exchange or sale price.

Figure 4:
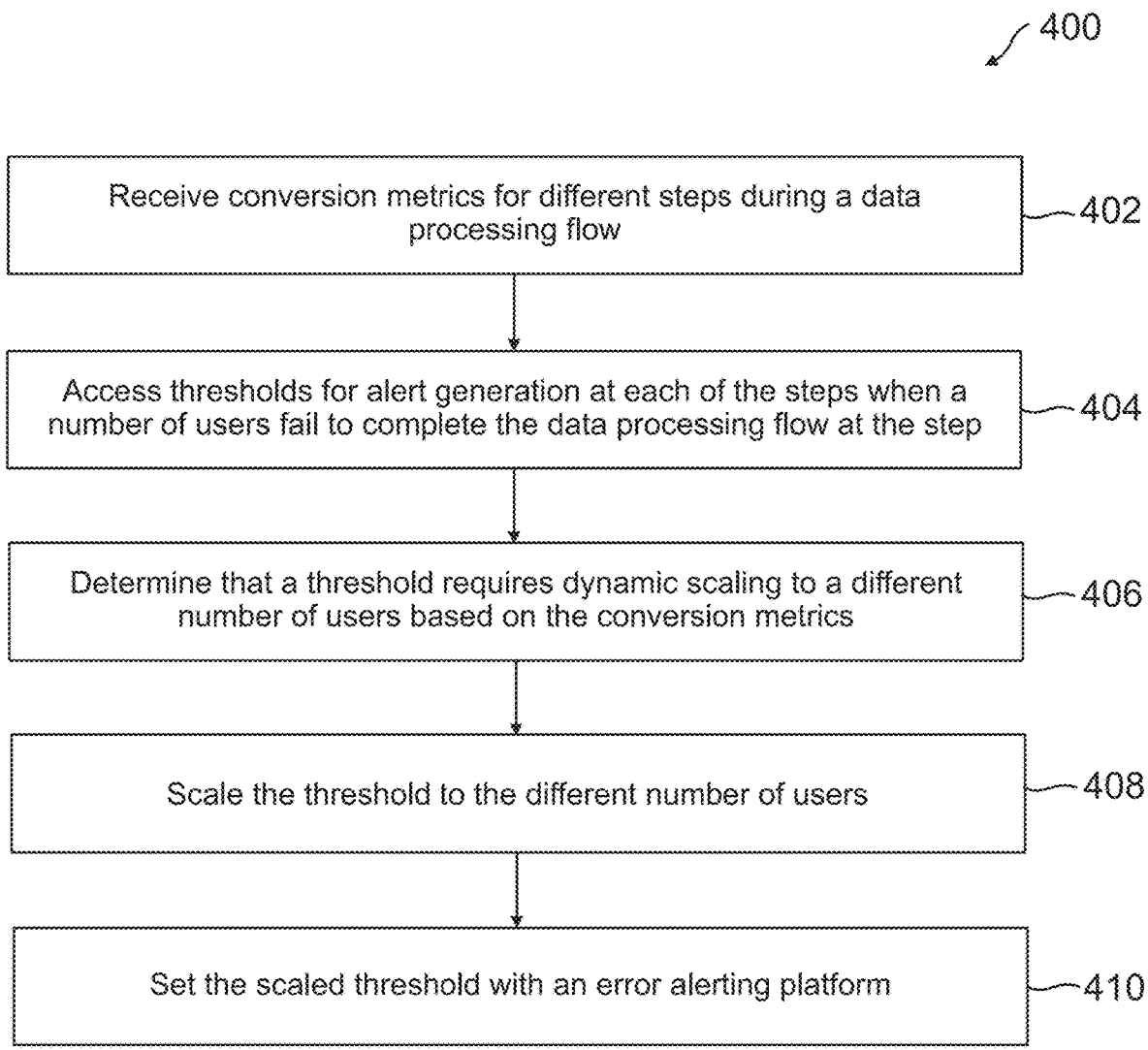
FIG. 4 is a flowchart of an exemplary process for scalable error alerts threshold based on conversion metrics for data processing flows, according to an embodiment.

FIG. 4 is a flowchart 400 of an exemplary process for scalable error alerts threshold based on conversion metrics for data processing flows, according to an embodiment. Note that one or more steps, processes, and methods described herein of flowchart 400 may be omitted, performed in a different sequence, or combined as desired or appropriate.

Flowchart 400 in FIG. 4 includes steps executed by service provider server 120 with client device 110, such as using error alerting platform 130 when tracking and generating alerts for errors during computing service usage by users based on dynamic scaling thresholds. As such, different portions of the steps of flowchart 400 are shown as being performed by, on, or with ATDE 132 when providing alert 114 and other data to client device 110. At step 402 of flowchart 400, conversion metrics for different steps during a data processing flow are received or accessed. For example, ATDE 132 of error alerting platform 130 may receive or access conversion metrics 134 for processing and determination of whether threshold 136 require dynamic scaling 138. In this regarding conversion metrics 134 may include information for current and/or past (e.g., over a period of time, such as the last 1 hour, day, week, etc.) rates of attrition, abandonment, loss, failure to complete, and/or failure to convert for users when entering and/or engaging in a data processing flow, such as one of processing flows 124 of service applications 122. The data for conversion metrics 134 may therefore indicate the number of users that are failing to convert, or otherwise complete processing flows 124, including the steps at which the users drop-off, and other analytics for abandonments of processing flows 124.

At step 404, thresholds for alert generation at each of the steps when a number of users fail to complete the data processing flow at the step are accessed or determined. Thresholds 136 may correspond to a set number of users that abandon different ones of processing flows 124, including the steps of the corresponding processing flows, due to an error. As such, when thresholds 136 are reached or exceeded, that breaching of thresholds 136 causes an error alert of the corresponding error to be generated. With accessing data for threshold 136, additional information relevant to setting, adjusting, and/or scaling thresholds 136 may be accessed and/or determined. For example, data from incentive platform 206, marketing platform 208, analytics platform 210, MDF 212, and/or UBD 214 may each be accessed and/or determined, which may be used to predict times where errors may cause high value users (or ones likely to complete a processing flow) to abandon processing flows 124 and/or cause an increase in user abandonments due to errors. This may include an upcoming marketing strategy or incentive where more users are expected to utilize a computing service (e.g., trade cryptocurrency or engage in purchases). As such, thresholds 136 may need to be tightened and be more sensitive to errors (e.g., generate alerts at a lower threshold number of users abandoning a data processing flow) when these events occur. Thresholds 136 may also be adjusted based on the type of processing flow 124, e.g., a flow that, if completed, has a dollar amount exceeding a threshold, may have a lower threshold, such that alerts are generated more quickly, resulting in potential errors being addressed more quickly and improving chances the processing flow is completed. On the other hand, "low" value flows may have higher thresholds, resulting in less frequent generation of alerts, which may not add enough value to warrant the additional time and resources for generating and addressing the alert.

At step 406, it is determined that a threshold requires dynamic scaling to a different number of users based on the conversion metrics. Conversion metrics 134 may indicate when conversion rates of users change due to errors or more generally due to user drop-off, abandonment, or attrition due to other factors (e.g., non-serious users that may not want to complete a flow, unavailable funds, wrong platform, mobile platforms where users may be more likely to complete using personal computers, etc.). As such, conversion metrics 134 alone may be sufficient to determine if one or more of thresholds 136 should be dynamically scaled to different numbers of users so that the thresholds more be more or less sensitive to user conversion rates and alert transmission. An AI engine, such as one using an ML model or NN, may further predict thresholds and corresponding numbers of users. Further, the additional data obtained from the different platforms of or accessible to service provider server 120 may further be processed by such engines to perform predictive scaling of thresholds 136 and determination of dynamic scaling 138.

At step 408, the thresholds are scaled to the different number of users. When performing dynamic scaling 138 of thresholds 136, each of thresholds 136 may have a first number of users at which the threshold is set. This first number of users may then be dynamically scaled up or down depending on a second number of users determined by the AI engine for dynamic scaling 138 (e.g., based on conversion metrics 134 and/or other data from system components, applications, data feeds or streams, and the like). Thus, dynamic scaling 138 may include adjusting, updating, or otherwise changing thresholds 136 based on the corresponding number of users, which, when met or exceeded, an alert is then triggered and issued. Adjusting may include adjusting individual thresholds at certain steps, which may be more restrictive and sensitive the further into a data processing flow (e.g., alert at a lower number of users at a later step in a processing flow) to account for the seriousness of the users in competing the flow. Further, with adjusting the thresholds at different steps, multiple thresholds at an individual step may also be adjusted, such as different thresholds for different alert prioritization designations and/or priority levels, each of which may indicate an urgency or ranking of the alert among other alerts. In addition, as noted above, thresholds can also be adjusted based on the type of processing flow.

At step 410, the scaled threshold is set with an error alerting platform. For example, ATDE 132 may establish thresholds 136 after scaling with error alerting platform 130 such that error handlers and detectors may detect users that may abandon or fail to complete a data processing flow in association with encountering an error (e.g., drop-off after an error occurs). Once the condition for the number of users abandoning a data processing flow at a step and due to an encountered error is met or exceeded for a corresponding threshold, then an alert may be generated and issued. The alert may information for the error and the number of users abandoning or other conversion failure rate at the step of the data processing flow. The information for the error may include network traffic or other computing logs of the error, as well as a prioritization of the alert based on the threshold and number of errors failing to convert. As such, one or more users, teams, or the like may review the errors and assist in error resolution, maintenance, debugging, and the like.

Figure 5:
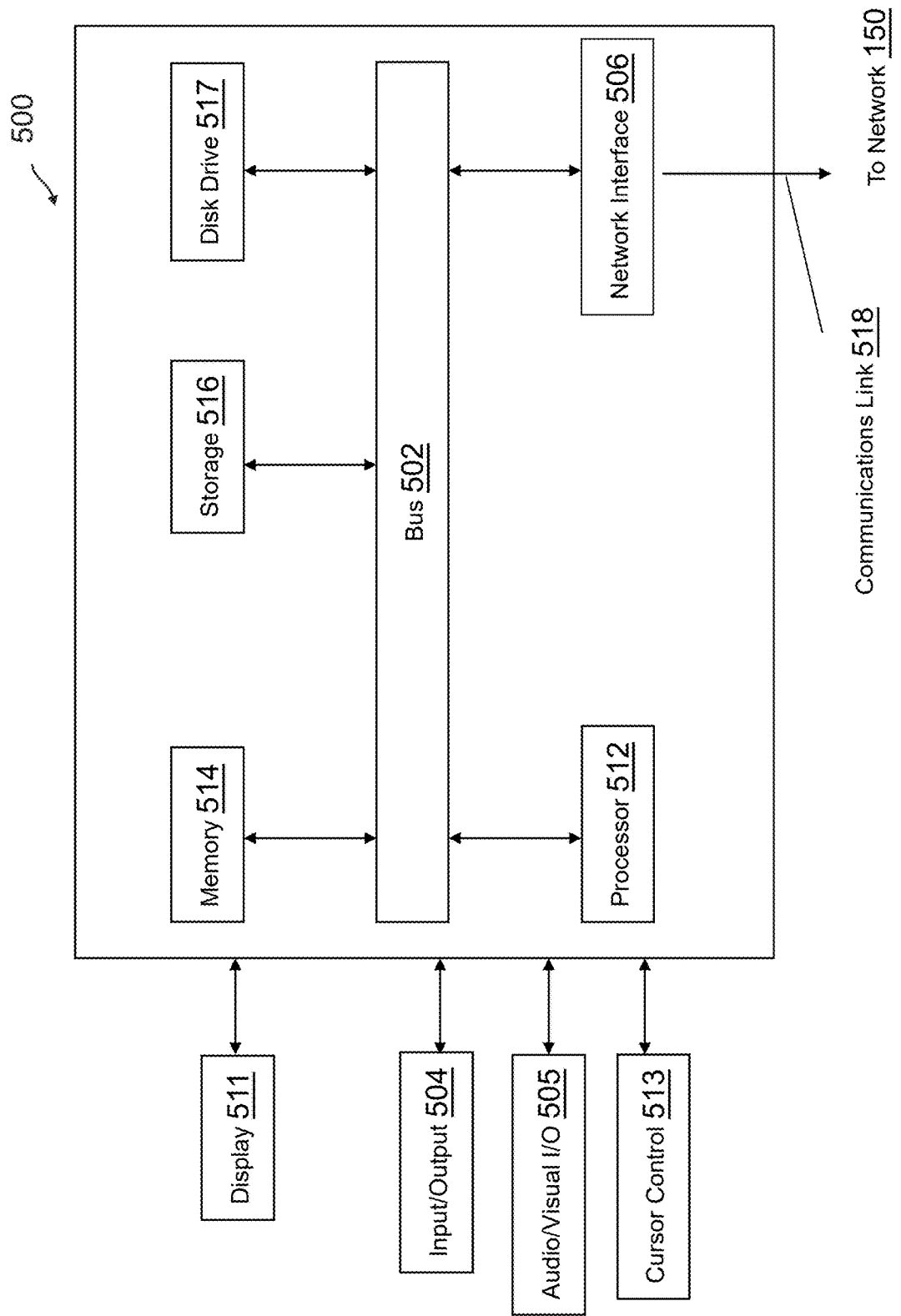
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
receiving a conversion metric for users that complete a step in a data processing flow of an application corresponding to a service provider, wherein the conversion metric indicates a detected number of users that fail to complete the data processing flow at the step;
accessing a threshold corresponding to an alert generated when a first number of users fail to complete the data processing flow at the step, wherein the threshold is dynamically scalable to different numbers of users based at least on the conversion metric;
determining a second number of users for the threshold based on the conversion metric;
scaling the threshold to the second number of users based on the conversion metric; and
establishing the scaled threshold with an error alerting platform for the step, wherein the establishing causes the error alerting platform to generate the alert when the second number of users is detected as failing to complete the data processing flow at the step instead of the first number of users.

2. The method of claim 1, wherein the conversion metric comprises the detected number of users that abandon the data processing flow after encountering one or more errors at the step, and wherein the conversion metric is one of a plurality of conversion metrics for a plurality of stages of the data processing flow, each of the plurality of conversion metrics indicating a corresponding detected number of users.

3. The method of claim 2, wherein each of the plurality of stages has a corresponding one of a plurality of thresholds, wherein each of the plurality of thresholds is based on at least one of the data processing flow, an amount completed of the data processing flow, or past rates of users failing to complete the data processing flow during the plurality of stages, and wherein the plurality of thresholds are preset prior to being dynamically scaled over time based on the plurality of conversion metrics.

4. The method of claim 1, further comprising:
detecting, at a time after the establishing, that the threshold has been met or exceeded; and
generating the alert via the error alerting platform of one or more errors causing the threshold to be met or exceeded at the time.

5. The method of claim 4, further comprising:
transmitting, to a computing device associated with the service provider, the alert with a prioritization designation based on the threshold.

6. The method of claim 4, wherein the alert comprises a report of the one or more errors identifying a potential computing bug requiring attention, and wherein the alert further comprises one or more computing logs associated with the one or more errors by users encountering the one or more errors at the step with an identification of the step.

7. The method of claim 1, wherein the threshold is one of multiple thresholds configured at the step for different prioritizations of users failing to complete the data processing flow at the step.

8. The method of claim 1, wherein the threshold is dynamically scalable using an artificial intelligence (AI) model, and wherein the determining the second number of users is performed using the AI model.

9. A system comprising:
a non-transitory memory; and
one or more hardware processors coupled to the non-transitory memory and configured to execute instructions to cause the system to:
receive a conversion metric for a step in a data processing flow, wherein the conversion metric comprises a detected number of users that fail to complete the data processing flow when encountering one or more errors at the step;
determine a number of users for a threshold corresponding to the step, wherein the threshold causes an alert to be generated when the number of users are detected as failing to complete the data processing flow at the step due to the one or more errors;
scale the threshold from a previous number of users to the number of users;
monitor users at the step for failures to complete the data processing flow; and
responsive to the monitored users meeting or exceeding the number of users for the scaled threshold, issue the alert corresponding to the one or more errors detected at the step that cause the failures to complete the data processing flow.

10. The system of claim 9, wherein the conversion metric is associated with one or more errors occurring at the step, and wherein the conversion metric is one of a plurality of conversion metrics for a plurality of stages of the data processing flow, each of the plurality of conversion metrics indicating a corresponding detected number of users.

11. The system of claim 10, wherein each of the plurality of stages has a corresponding one of a plurality of thresholds, wherein each of the plurality of thresholds is based on at least one of a completion amount of the data processing flow or a past abandonment rate of the data processing flow at a corresponding one of the plurality of stages, and wherein the plurality of thresholds are preset prior to being dynamically scaled over time based on the plurality of conversion metrics.

12. The system of claim 9, wherein the instructions are further executable to cause the system to:
determine error data for the one or more errors detected at the step, wherein the error data is available with the issued alert.

13. The system of claim 9, wherein the alert is issued with a prioritization designation based on the threshold.

14. The system of claim 9, wherein the alert comprises a report of the one or more errors identifying a potential computing bug requiring attention, and wherein the alert further comprises one or more computing logs associated with the one or more errors detected at the step.

15. The system of claim 9, wherein the threshold is one of multiple thresholds configured at the step for different prioritizations of the one or more errors based on corresponding numbers of users abandoning the data processing flow at the step.

16. The system of claim 9, wherein the threshold is dynamically scalable using an artificial intelligence (AI) engine, and wherein determining the number of users is performed using the AI engine.

17. A non-transitory machine-readable medium having stored thereon machine-readable instructions executable to cause a machine to perform operations comprising:

receiving conversion metrics for different steps during a data processing flow, wherein the conversion metrics indicate users that abandoned the data processing flow prior to completing the data processing flow based on one or more errors encountered during the data processing flow;

determining, at a first time, a detected number of the users that abandoned the data processing flow at a step of the different steps;

scaling a threshold for the step from a first number of users to a second number of users based on the detected number of the users, wherein meeting or exceeding the threshold causes an alert to be generated for the one or more errors encountered by the users at the step;

determining, at a second time after the first time, that the threshold has been met or exceeded by further users utilizing the data processing flow; and reporting the alert via an error alerting platform.

18. The non-transitory machine-readable medium of claim 17, wherein each of the different steps have one or more corresponding thresholds, and wherein the one or more corresponding thresholds are scaled to a lower number progressively for each of the different steps based on a number of preceding steps in the data processing flow.

19. The non-transitory machine-readable medium of claim 17, wherein the conversion metrics are each associated with a corresponding one of the one or more errors that cause abandonments of the data processing flow by the users, and wherein each of the conversion metrics indicates a corresponding detected number of users.

20. The non-transitory machine-readable medium of claim 17, wherein the alert comprises information indicating the one or more errors and computing logs corresponding to occurrences of the one or more errors, and wherein the alert further comprises a prioritization designation based on the threshold.

* * * * *